(12) United States Patent
Chen

(10) Patent No.: US 9,107,248 B2
(45) Date of Patent: Aug. 11, 2015

(54) SENSOR NETWORK-ENABLED LIGHT SOCKET ADAPTOR

(71) Applicant: Shyh Min Chen, Plano, TX (US)

(72) Inventor: Shyh Min Chen, Plano, TX (US)

( * ) Notice: Subject to any disclaimer, the term of this patent is extended or adjusted under 35 U.S.C. 154(b) by 0 days.

(21) Appl. No.: 14/201,567

(22) Filed: Mar. 7, 2014

(65) Prior Publication Data

US 2014/0252962 A1 Sep. 11, 2014

Related U.S. Application Data

(60) Provisional application No. 61/774,766, filed on Mar. 8, 2013.

(51) Int. Cl.
*F21V 1/00* (2006.01)
*H05B 37/02* (2006.01)
*H01R 33/945* (2006.01)
*F21V 19/00* (2006.01)
*F21V 23/04* (2006.01)

(52) U.S. Cl.
CPC ........ *H05B 37/0218* (2013.01); *H01R 33/9453* (2013.01); *H05B 37/0227* (2013.01); *H05B 37/0272* (2013.01); *H05B 37/0281* (2013.01); *F21V 19/006* (2013.01); *F21V 23/0442* (2013.01); *Y02B 20/40* (2013.01); *Y02B 20/42* (2013.01); *Y02B 20/46* (2013.01)

(58) Field of Classification Search
USPC .............. 315/178, 182, 183, 89, 90; 362/227, 362/228, 229, 240; 340/286.02; 439/620.02
See application file for complete search history.

(56) References Cited

U.S. PATENT DOCUMENTS

| | | | |
|---|---|---|---|
| 8,033,686 B2 * | 10/2011 | Recker et al. | 362/249.02 |
| 8,531,137 B2 * | 9/2013 | Jonsson | 315/318 |
| 8,770,771 B2 * | 7/2014 | Preta et al. | 362/20 |
| 2009/0122571 A1 * | 5/2009 | Simmons et al. | 362/546 |
| 2010/0244735 A1 * | 9/2010 | Buelow, II | 315/294 |
| 2014/0139120 A1 * | 5/2014 | Chien | 315/155 |

* cited by examiner

*Primary Examiner* — Thuy Vinh Tran
(74) *Attorney, Agent, or Firm* — Klemchuk LLP; Kirby B. Drake

(57) ABSTRACT

A light power socket adaptor is positioned between an energy-saving light bulb and a light socket that provides electrical power to the light bulb. Light power socket adaptors are network-enabled, and a sensor network is ZigBee, which is IEEE compliant and quickly forms a mesh network. Each node on the network operates independently. Each node also functions as a router so that it forwards data packets to other nodes if the data received is targeted for its own consumption. Each adaptor further includes a motion sensor as well as a photo (day/night) sensor.

20 Claims, 4 Drawing Sheets

SENSOR NETWORK-ENABLED LIGHT SOCKET ADAPTOR

CROSS-REFERENCE TO RELATED APPLICATION

This application claims the benefit of U.S. Provisional Application No. 61/774,766, entitled "SENSOR NETWORK ENABLED LIGHT SOCKET ADAPTOR," filed Mar. 8, 2013, which is incorporated herein by reference in its entirety.

FIELD OF THE DISCLOSURE

The present disclosure generally relates to electricity conservation and management, and more particularly to electricity conservation and management through a sensor network-enabled light socket adaptor.

BACKGROUND

General lighting consumes 6.5% of the total electricity that is generated worldwide. Of that 6.5%, residential lighting consumes 31% and commercial lighting consumes 43%. When so much electricity is being consumed through lighting, the $CO_2$ emissions associated with electricity consumption may be leading to weather pattern changes worldwide.

SUMMARY

Embodiments of the present disclosure may provide a network-enabled light socket adaptor comprising a sensor network, a photo sensor that detects the time of day, a motion sensor that senses the presence of one or more objects, and a controller that provides instructions to a first light source affixed to the network-enabled light socket adaptor, the instructions based on one or more of the following parameters: day of the week, time of the day, input from a motion sensor, and input from a photo sensor. The instructions may comprise one or more of the following: turning on the first light source, turning off the first light source, time that the first light source is on, dimming of the first light source, changing the color of the first light source, and adjusting the light intensity of the first light source. The controller may be controlled by a user over a wireless network via one or more central computing points comprising a personal computer, a laptop, a tablet, a mobile phone, and a remote control. The first light source may be selected from the group comprising an LED, a compact fluorescent light bulb, and an energy-saving light bulb. The network-enabled light socket adaptor may further comprise a second light source that provides a separate lighting source from the first light source. The network-enabled light socket adaptor may further comprise a DC power source powering the second light source. The DC power source may be a rechargeable battery. The second light source may be an LED. The sensor network may comprise one or more of the following Bluetooth, IrDA, wireless USB, Z-Wave, Body Area Network, and ZigBee. The sensor network may utilize ZigBee. Each node of the sensor network may operate independently. Each node of the sensor network may function as a router. The sensor network may have relay capabilities to allow communication between the network-enabled light socket adaptor and other network-enabled light socket adaptors. The sensor network may have an autonomous networking configuration. The network-enabled light socket adaptor may also comprise an announcing system that may be triggered by movement in the vicinity of the motion sensor. The motion sensor and the photo sensor may be independently programmable.

Other embodiments of the present disclosure may provide a network-enabled light socket adaptor system comprising a plurality of network-enabled light socket adaptors connected in series through a sensor network, each of the plurality of network-enabled light socket adaptors comprising a photo sensor that may detect the time of day, a motion sensor that may sense the presence of one or more objects, and a controller that may provide instructions to a first light source affixed to the network-enabled light socket adaptor, the instructions based on one or more of the following parameters day of the week, time of the day, input from a motion sensor, and input from a photo sensor. The motion sensor in a first of the plurality of network-enabled light socket adaptors may sense the presence of the one or more objects and the first light source associated with the first of the plurality of network-enabled light socket adaptors and the first light source of the network-enabled light socket adaptor adjacent to the first of the plurality of network-enabled light socket adaptors each respond to an instruction from the respective controllers. The instructions may comprise one or more of the following turning on the first light source, turning off the first light source, time that the first light source is on, dimming of the first light source, changing the color of the first light source, and adjusting the light intensity of the first light source. The sensor network may comprise one or more of the following Bluetooth, IrDA, wireless USB, Z-Wave, Body Area Network, and ZigBee.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure may provide a light power socket adaptor that may be positioned between an energy-saving light bulb and a light socket that may provide electrical power to the light bulb. Light power socket adaptors according to embodiments of the present disclosure may be network-enabled, and a sensor network may be ZigBee, which is IEEE compliant and can quickly form a mesh network, as described in more detail below. Each node on the network may operate independently. Each node may also function as a router so that it may forward data packets to other nodes if the data received is not targeted for its own consumption. Adaptors according to embodiments of the present disclosure may further include a motion sensor as well as a photo (day/night) sensor.

Figure 1:
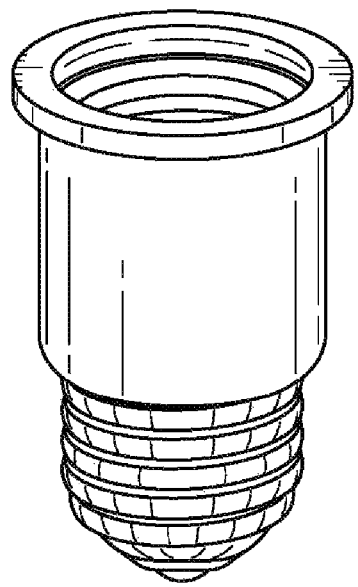
FIG. 1 depicts a typical lighting power socket adaptor.
Figure 2:
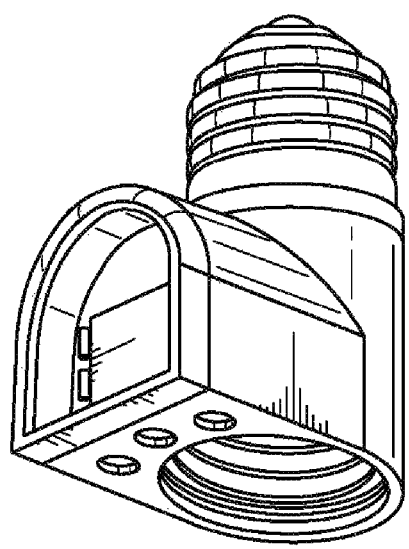
FIG. 2 depicts a network-enabled light socket adaptor according to an embodiment of the present disclosure.
Figure 3:
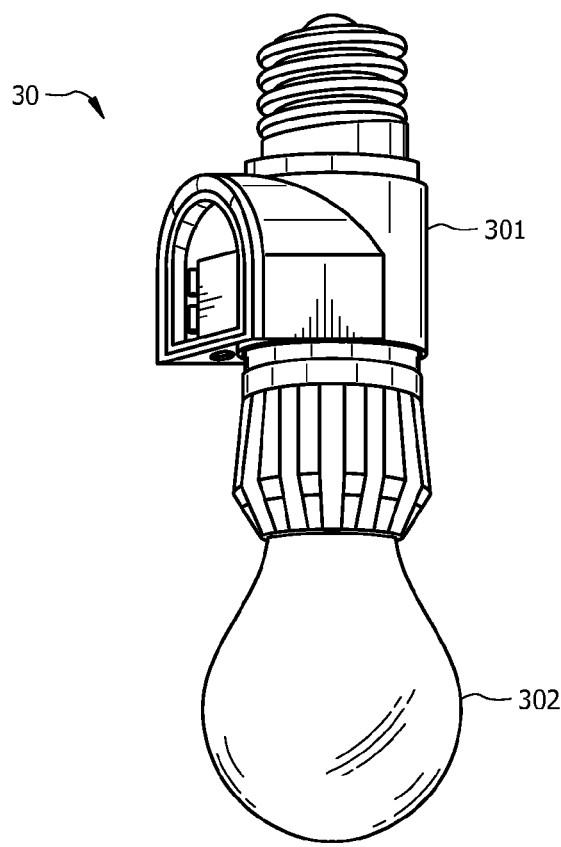
FIG. 3 depicts a network-enabled light socket adaptor combined with a light bulb according to an embodiment of the present disclosure.

FIG. 3 depicts network-enabled light socket adaptor 301 (as depicted separately in FIG. 2) when connected with light bulb 302 according to an embodiment of the present disclosure. While FIGS. 2 and 3 depicts a general shape for a sensor network-enabled light socket adaptor according to an embodiment of the present disclosure, it should be appreciated that the shape of the adaptor may be modified depending on design and other requirements without departing from the present disclosure. The sensor network-enabled light socket adaptor of FIG. 2 may be compared with FIG. 1 depicting a typical light power socket adaptor in order to further appreciate the improvements provided by adaptors according to embodiments of the present disclosure.

Figure 4:
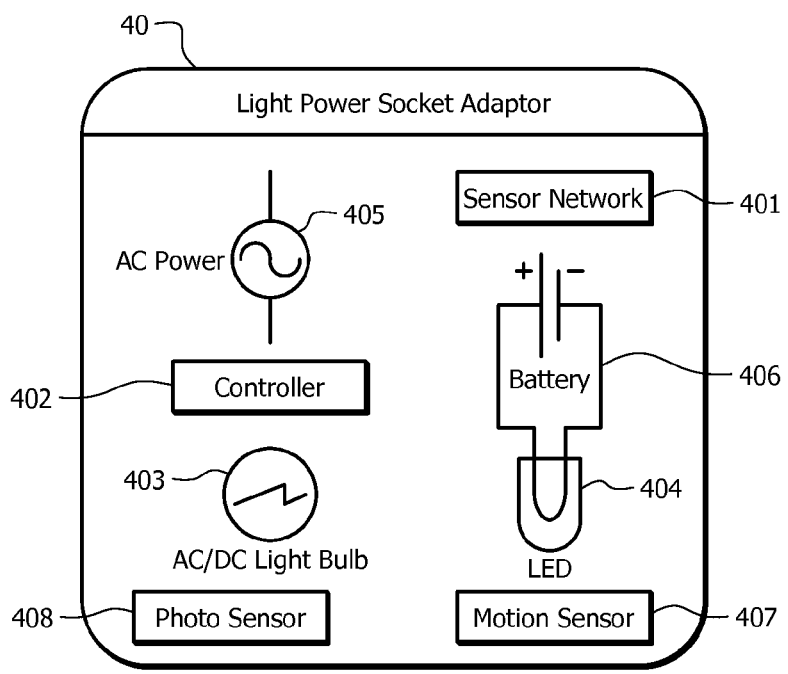
FIG. 4 depicts the main components of a network-enabled light socket adaptor according to an embodiment of the present disclosure.

FIG. 4 depicts the main components of network-enabled light socket adaptor 40 according to an embodiment of the present disclosure. Adaptor 40 may include but is not necessarily limited to sensor network 401, controller 402, AC/DC light bulb 403, LED 404, AC power 405, rechargeable battery 406, motion sensor 407 and photo sensor 408. Each of these components is described in further detail below.

Two lighting sources may generally be provided in embodiments of the present disclosure—AC/DC light bulb 403 and LED 404. AC/DC light bulb 403 may include but is not limited to an LED, a compact fluorescent light bulb, and other energy-saving light bulbs that may be known to one of ordinary skill of the art. AC/DC light bulb 403 may be powered by AC power 405 provided within light power socket adaptor 40 according to an embodiment of the present disclosure. Controller 402 may selectively operate AC/DC light bulb 403 according to embodiments of the present disclosure. It should be appreciated that AC power 405 may be regulated by controller 402 to become DC power to power AC/DC light bulb 403 with DC power according to some embodiments of the present disclosure. In an embodiment of the present disclosure, controller 402 may be utilized to provide instructions to AC/DC light bulb 403 to turn on or turn off. In other or further embodiments of the present disclosure, controller 402 may provide instructions to AC/DC light bulb 403 to adjust the light intensity or brightness of AC/DC light bulb 403 at given times. However, it should be appreciated that controller 402 may provide other instructions to AC/DC light bulb 403 without departing from the present disclosure. A user of light power socket adaptor 40 may provide instructions to controller 402 as to whether AC/DC light bulb 403 should be turned on and off and the light intensity of AC/DC light bulb 403 over a wireless network via his/her computer, mobile device or remote control as may be described in further detail with respect to FIG. 5. It also should be appreciated that a user may program AC/DC light bulb to turn on or off and/or change its intensity or brightness based on a variety of factors, including but not limited to, the day/time of the week, input from motion sensor 407, input from photo sensor 408 and combinations thereof according to embodiments of the present disclosure.

Photo sensor 408 may provide adaptor 40 with the means to detect whether it is daytime or nighttime. Motion sensor 407 may be used for autonomous control purposes as described in more detail below. In other embodiments of the present disclosure, motion sensor 407 may become part of the residential/commercial security system.

While not depicted in FIG. 4, it should be appreciated that adaptor 40 also may include an announcing system in some embodiments of the present disclosure. The announcing system may be utilized for security purposes to provide a buzzer or other alarm if motion sensor 407 is triggered. In some embodiments of the present disclosure, the announcing system may broadcast a prerecorded voice message when motion sensor 407 is triggered.

It should be appreciated that controller 402 may include a CPU, an LED driver, memory, EEPROM as well as a control circuit according to some embodiments of the present disclosure. However, there may be embodiments wherein controller 402 may include more or fewer components without departing from the present disclosure.

In an embodiment of the present disclosure, a user may turn an AC/DC light bulb on and off based on the time of day as well as through programming of photo sensor (day/night sensor) 408 in a first area. The user may then utilize input from motion sensor 407 to turn an AC/DC light bulb on and off in a second area. Then, in a third area, a user may elect to use a combination of time of day and input from motion sensor 407 to control an adaptor. It also should be appreciated that user programming of controller 402 may control the light intensity (brightness) of each AC/DC light bulb according to embodiments of the present disclosure.

LED 404 may be powered by DC power, such as rechargeable battery 406 (such as a lithium polymer battery) or another similar battery power source, according to an embodiment of the present disclosure. LED 404 may be a smaller, less powerful lighting mechanism than AC/DC light bulb 403 in some embodiments of the present disclosure. LED 404 may provide a separate lighting source from AC/DC light bulb 403. This may be utilized as backup or emergency lighting for an environment where light power socket adaptor 40 may be utilized when AC/DC light bulb 403 may not be operable. In other embodiments of the present disclosure, LED 404 may be used as a nightlight if adaptor 40 has been programmed to have such functionality.

A socket adaptor according to embodiments of the present disclosure may be sensor network enabled. It should be appreciated that different sensor networks may be employed according to embodiments of the present disclosure. Sensor network 401 may be a personal area network based on IEEE standards. For example, sensor network 401 may utilize ZigBee, a specification for a suite of high-level communication protocols used to create personal area networks built from small, low-power digital radios. ZigBee is based on an IEEE 802.15 standard and accordingly is adaptable for use within wireless personal area networks as it is standards-compliant. Using ZigBee as the specification for sensor network 401, light socket adaptor 40 may transmit data by passing data through intermediate devices to reach more distant ones, thereby creating a mesh network. Accordingly, sensor network 401 may include relay capability so that other light socket adaptors may be added to the system and operate using the sensor network without difficulty. The decentralized nature of sensor network 401 may allow for transmission and use even when a central node cannot be relied upon. Use of ZigBee, or another similar specification, may be desirable for applications that may require a low data rate, long battery life and secure networking. ZigBee and other similar applications can be simpler and less expensive than other wireless personal area networks (WPANs), such as Bluetooth or Wi-Fi. However, it should be appreciated that other networking applications, including but not limited to, Bluetooth, Wi-Fi, IrDA, wireless USB, Z-Wave, and Body Area Network, may be used in place of or to complement ZigBee within sensor network 401 without departing from the present disclosure.

Several different networking configurations may be provided according to embodiments of the present disclosure. In an autonomous networking configuration, each light socket (node) may respond based on input from its adjacent socket (node). Each node may communicate with another node via local commands once it has been configured via a centralized computer system according to embodiments of the present disclosure. In other embodiments of the present disclosure, each node may be controlled via a centralized computer system or a central computing point via global commands. A central computing point may include, but is not limited to, PCs, laptops, tablets and mobile devices. In some embodiments of the present disclosure, the node may be controlled remotely via a wireless network, such as the Internet. Features that may be controlled according to embodiments of the present disclosure may include, but are not limited to, time that the lighting is in use, light intensity, and dimming. Each node may communicate with another node via local commands once the node has been configured using a central computing point in some embodiments of the present disclosure. However, it should be appreciated that some nodes may be controlled in an autonomous mode while other nodes may be controlled in a centralized mode without departing from the present disclosure.

Figure 5:
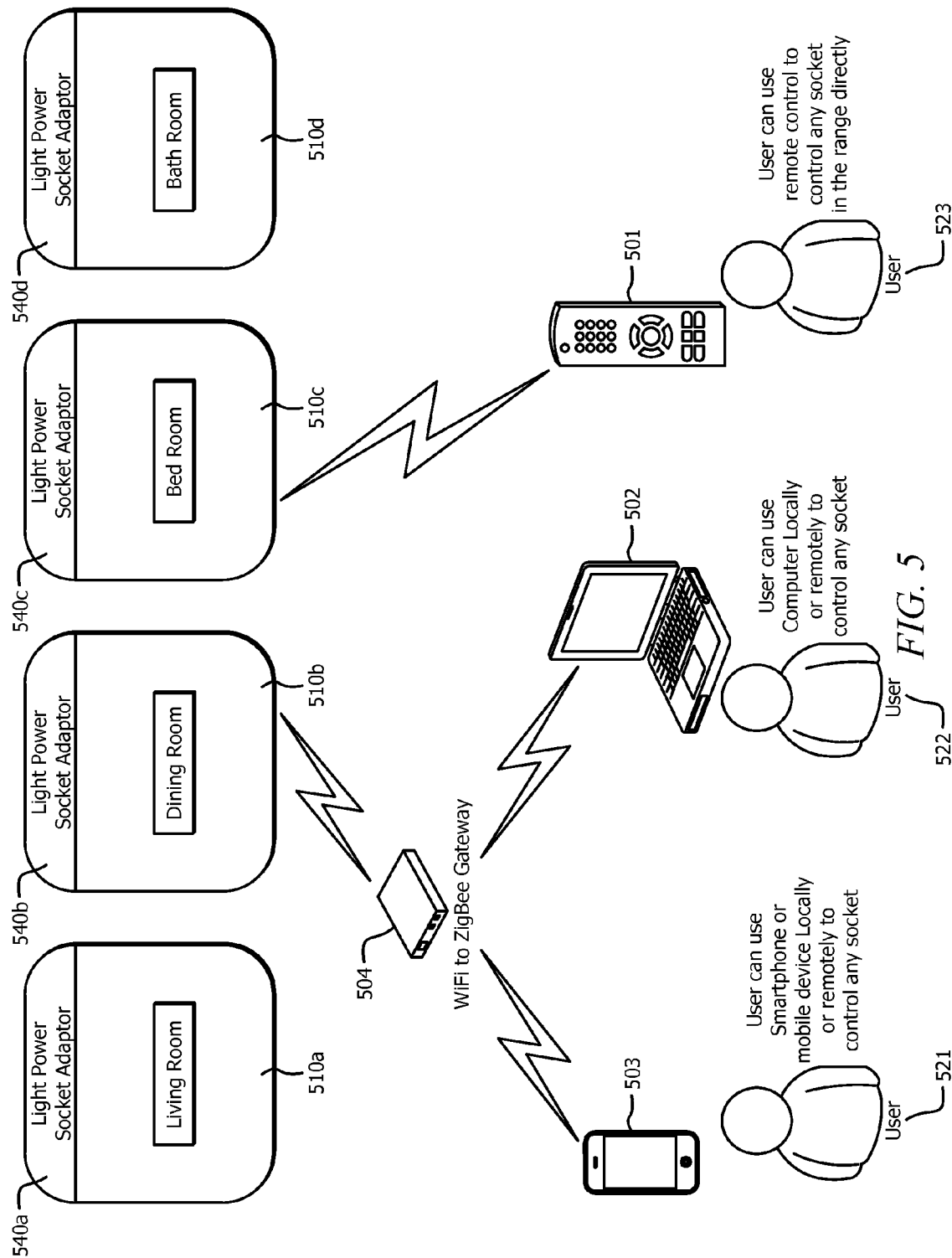
FIG. 5 depicts a residential application of a network-enabled light socket adaptor according to an embodiment of the present disclosure.
Figure 6:
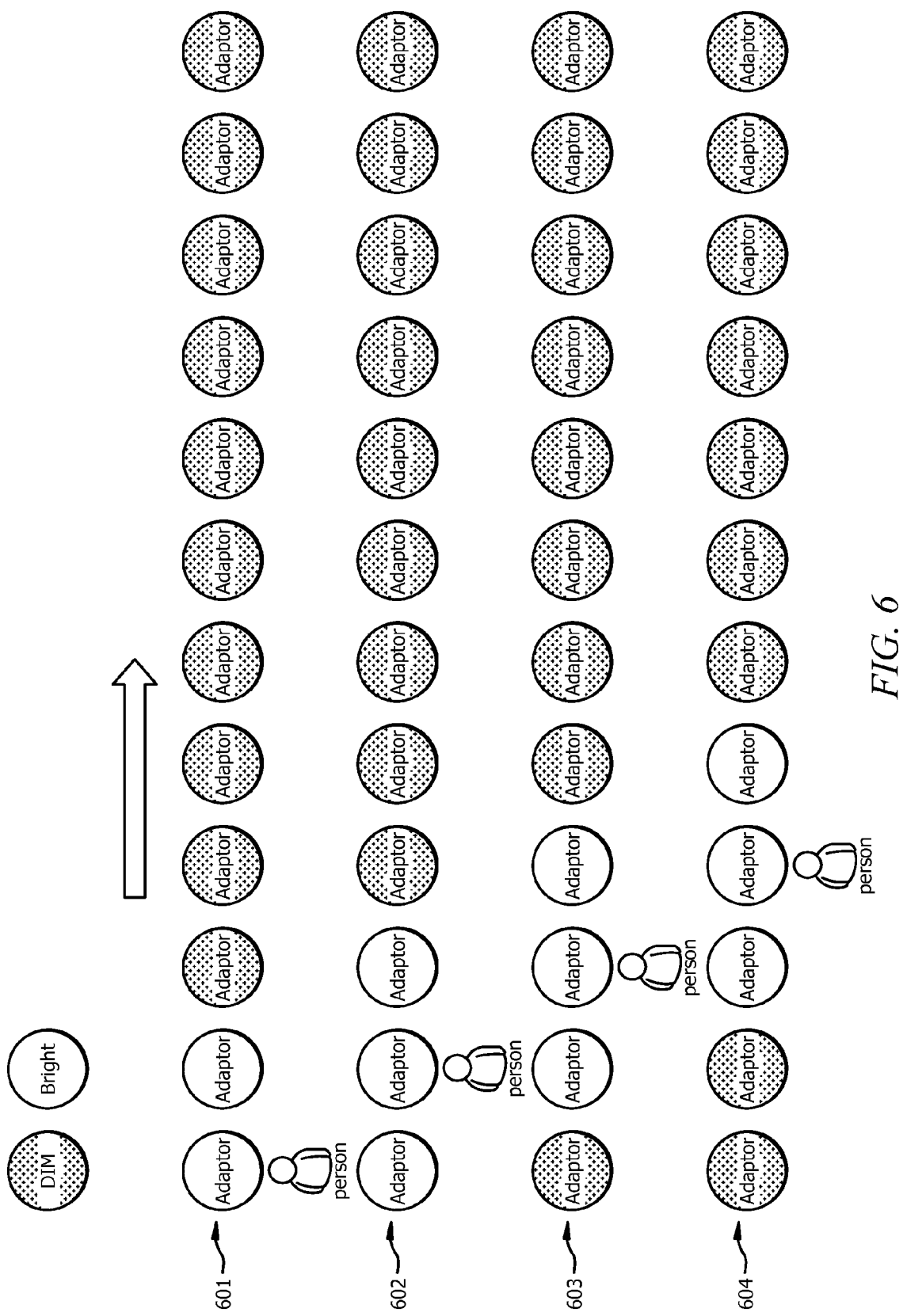
FIG. 6 depicts a commercial application of a network-enabled light socket adaptor according to an embodiment of the present disclosure.

Embodiments of the present disclosure may provide sensor network-enabled light socket adaptors that may allow a user to add networking to his/her lighting system in a residential (such as depicted in FIG. 5) or commercial (such as depicted in FIG. 6) environment without expensive rewiring. A user may then be able to control the lighting associated with each light bulb associated with each adaptor individually.

FIG. 5 depicts a residential application of network-enabled light socket adaptors according to an embodiment of the present disclosure. Light power socket adaptors may be incorporated into one or more rooms of a residence according to embodiments of the present disclosure. In an embodiment of the present disclosure, living room 510a, dining room 510b, bedroom 510c and bathroom 510d may each include one or more light power socket adaptors. As depicted in FIG. 5, living room 510a may include light power socket adaptor 540a, dining room 510b may include light power socket adaptor 540b, bedroom 510c may include light power socket adaptor 540c, and bathroom 510d may include light power socket adaptor 540d. However, it should be appreciated that each of the rooms may include more than one light power socket adaptor without departing from the present disclosure. In addition, it should be appreciated that more or fewer than four rooms within a residence may include one or more light power socket adaptors without departing from the present disclosure.

A programmable lighting socket adaptor may be controlled via remote control 501, such as a television remote, to control every socket in range. A user may selectively control every socket in range via his/her PC/laptop/tablet 502 or mobile device 503, such as a Smartphone, via wireless network connection 504 to a ZigBee gateway. It should be appreciated that wireless network connection 504 may include but is not limited to WiFi, a ZigBee gateway, another sensor network gateway or a combination of the above without departing from the present disclosure.

As previously described, a user may utilize one or more devices to control sockets according to embodiments of the present disclosure. In step 521, a user may utilize his/her mobile device 503 locally or remotely to control any socket. In step 522, a user may utilize his/her computer 502 locally or remotely to control any socket. In step 523, a user may utilize remote control 501 to control any socket that is within range of remote control 501. Regardless which device may be utilized to control sockets according to embodiments of the present disclosure, it should be appreciated that the user may be provided with a software application operable on one or more of these devices to selectively control applications with respect to one or more of the sockets. For example, if the user is utilizing a mobile device such as Smartphone, he/she may download an application that may provide the user with various options for programming one or more of the sockets.

FIG. 6 depicts a commercial application of a network-enabled light socket adaptor according to an embodiment of the present disclosure. It should be appreciated that embodiments of the present disclosure may provide for incorporation of network-enabled light socket adaptors in hallways or other places within a commercial building where lighting control may be desired.

In step 601, a series of network-enabled light socket adaptors may be provided, for example, in a hallway, such that as a person walks down the hallway, a sensor within the first adaptor may sense the presence of the person, and the light bulb associated with the first adaptor may shine at full brightness. A light bulb associated with at least one adaptor adjacent to the first adaptor may also shine at full brightness.

In step 602, as a person walks down the hallway, the sensor in the adaptor adjacent to the first adaptor may detect the presence of the person, thereby causing the light bulb associated with that adaptor to shine at full brightness. In this embodiment of the present disclosure, the light bulbs associated with adjacent adaptors also may shine at full brightness. It should be appreciated that adjacent adaptors may include one adaptor on either side of the adaptor nearest to the person or it may include more than one adaptor on each side of that adaptor without departing from the present disclosure.

Step 603 further depicts how, as a person walks down the hallway, he/she will near another adaptor. When the sensor within the adaptor senses the person, the light bulb associated with that adaptor may shine at full brightness. Similar to step 602, the light bulbs associated with the adaptors that may be adjacent to that adaptor also may shine at full brightness. However, in this embodiment of the present disclosure, as the person has moved away from the first adaptor (wherein the light bulb associated with that adaptor was shining in step 601), the light bulb associated with the first adaptor has gone dim. It should be appreciated that there may be embodiments of the present disclosure wherein the light bulb associated with the first adaptor may continue to shine even when the person is in the position depicted in step 603 without departing from the present disclosure.

Step 604 provides a further depiction of how light bulbs associated with certain adaptors may shine at full brightness or dim depending on the position of the person relative to the adaptor according to embodiments of the present disclosure. While the light bulbs associated with certain adaptors have been described as shining at full brightness when the person is in the vicinity of those adaptors, it should be appreciated that there may be embodiments of the present disclosure wherein the light bulbs may shine at different levels of brightness. For example, the light bulb associated with the adaptor nearest the person may shine at full brightness while the light bulbs associated with adjacent adaptors may shine with less brightness. In other embodiments of the present disclosure, if more light bulbs than those associated with adaptors immediately adjacent to the adaptor nearest the person are to shine as a person moves through a hallway, the light bulbs immediately adjacent may shine at full brightness while other light bulbs may shine at a lesser brightness. In further embodiments of the present disclosure, the brightness of the light bulbs may diminish as the distance between the light bulb and the person increases. Regardless what brightness is associated with a given adaptor, it should be appreciated that the brightness may be fully controlled through the adaptor associated with the light bulb according to embodiments of the present disclosure.

Power light socket adaptors utilized within a commercial application such as that depicted in FIG. 6 may form a simple sensor network without the need for installation or use of complicated, expensive networking equipment. Each adaptor may be installed within the hallway, for example, and a node address may be assigned to each adaptor. Once a node address has been assigned, the adaptors may begin communication with each other over the sensor network according to embodiments of the present disclosure. It should be appreciated that the operator of the adaptors may elect to control the adaptors locally. The operator may additionally or alternatively control the adaptors remotely, such as via the Internet or through an Intranet application according to embodiments of the present disclosure.

It should be appreciated that utilizing network-enabled light power socket adaptors may help individuals and entities conserve lighting electricity without changing their lifestyle or sacrificing safety. The conserved electricity may help reduce the $CO_2$ emissions into the atmosphere that may be linked to weather pattern changes worldwide.

It should be appreciated that light power socket adaptors according to embodiments of the present disclosure also may also be used to control colored LED light bulbs in a large area via a sensor network. It should be appreciated that specially colored LED light bulbs may be provided to work with socket adaptors according to embodiments of the present disclosure. This may be a very desirable feature for large commercial shopping centers, ballrooms, pubs, bars, dance clubs or other commercial buildings where the color of the LED lights in a large area can be changed and controlled dynamically and synchronously based on the season and special event without expensive investment into other equipment. It also may be utilized within the residential environment in some embodiments of the present disclosure. The user may acquire the socket adaptor and a colored LED light bulb that may work with the socket adaptor, and using the socket adaptor according to embodiments of the present disclosure, the user may be able to control an entire area containing LED light bulbs dynamically and synchronously via a computer, remote control or other mobile device. For example, colored LED light bulbs may be dimmed to certain color when an event starts, then the colored LED light bulbs may flash in different colors and with different light intensities during the event. Having such functionality may instantly convert a mono-color lighting system to a color lighting system wherein color may be changed based on pre-programming or via instant commands associated with an event (i.e., coordinated with music).

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A network-enabled light socket adaptor comprising:
    a sensor network;
    a photo sensor that detects a time of day;
    a motion sensor that senses the presence of one or more objects; and
    a controller that provides instructions to a first light source affixed to the network-enabled light socket adaptor, the instructions based on one or more of the following parameters:
    day of the week, time of the day, input from a motion sensor, and input from a photo sensor.

2. The network-enabled light socket adaptor of claim 1, the instructions comprising one or more of the following:
    turning on the first light source, turning off the first light source, time that the first light source is on, dimming of the first light source, changing the color of the first light source, and adjusting the light intensity of the first light source.

3. The network-enabled light socket adaptor of claim 1 wherein the controller is controlled by a user over a wireless network via one or more central computing points comprising:
    a personal computer, a laptop, a tablet, a mobile phone, and a remote control.

4. The network-enabled light socket adaptor of claim 1 wherein the first light source is selected from the group comprising:
    an LED, a compact fluorescent light bulb, and an energy-saving light bulb.

5. The network-enabled light socket adaptor of claim 1 further comprising:
    a second light source that provides a separate lighting source from the first light source.

6. The network-enabled light socket adaptor of claim 5 further comprising:
    a DC power source powering the second light source.

7. The network-enabled light socket adaptor of claim 6 wherein the DC power source is a rechargeable battery.

8. The network-enabled light socket adaptor of claim 5 wherein the second light source is an LED.

9. The network-enabled light socket adaptor of claim 1 wherein the sensor network comprises one or more of the following:
    Bluetooth, IrDA, wireless USB, Z-Wave, Body Area Network, and ZigBee.

10. The network-enabled light socket adaptor of claim 1 wherein the sensor network utilizes ZigBee.

11. The network-enabled light socket adaptor of claim 1 wherein each node of the sensor network operates independently.

12. The network-enabled light socket adaptor of claim 1 wherein each node of the sensor network functions as a router.

13. The network-enabled light socket adaptor of claim 1 wherein the sensor network has relay capabilities to allow communication between the network-enabled light socket adaptor and other network-enabled light socket adaptors.

14. The network-enabled light socket adaptor of claim 1 wherein the sensor network has an autonomous networking configuration.

15. The network-enabled light socket adaptor of claim 1 further comprising:
    an announcing system that is triggered by movement in the vicinity of the motion sensor.

16. The network-enabled light socket adaptor of claim 1 wherein the motion sensor and the photo sensor are independently programmable.

17. A network-enabled light socket adaptor system comprising:
a plurality of network-enabled light socket adaptors connected in series through a sensor network, each of the plurality of network-enabled light socket adaptors comprising:
a photo sensor that detects a time of day;
a motion sensor that senses the presence of one or more objects; and
a controller that provides instructions to a first light source affixed to the network-enabled light socket adaptor, the instructions based on one or more of the following parameters:
day of the week, time of the day, input from a motion sensor, and input from a photo sensor.

18. The network-enabled light socket adaptor system of claim 17, wherein the motion sensor in a first of the plurality of network-enabled light socket adaptors senses the presence of the one or more objects and the first light source associated with the first of the plurality of network-enabled light socket adaptors and the first light source of the network-enabled light socket adaptor adjacent to the first of the plurality of network-enabled light socket adaptors each respond to an instruction from the respective controllers.

19. The network-enabled light socket adaptor system of claim 17, the instructions comprising one or more of the following:
turning on the first light source, turning off the first light source, time that the first light source is on, dimming of the first light source, changing the color of the first light source, and adjusting the light intensity of the first light source.

20. The network-enabled light socket adaptor of claim 17 wherein the sensor network comprises one or more of the following:
Bluetooth, IrDA, wireless USB, Z-Wave, Body Area Network, and ZigBee.

* * * * *